United States Patent
Lewis et al.

(10) Patent No.: US 6,731,296 B2
(45) Date of Patent: *May 4, 2004

(54) METHOD AND SYSTEM FOR PROVIDING PROGRAMMABLE TEXTURE PROCESSING

(75) Inventors: Michael C. Lewis, San Jose, CA (US); Stephen L. Morein, Basking Ridge, NJ (US)

(73) Assignee: Broadcom Corporation, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,877

(22) Filed: May 7, 1999

(65) Prior Publication Data

US 2002/0070946 A1 Jun. 13, 2002

(Under 37 CFR 1.47)

(51) Int. Cl.[7] .................................................. G09G 5/02
(52) U.S. Cl. ...................................... 345/582; 382/269
(58) Field of Search ............................... 345/430, 431, 345/418, 419, 443, 581–593, 505, 561; 382/234, 241, 269, 270, 275, 304

(56) References Cited

U.S. PATENT DOCUMENTS

| | | | | | |
|---|---|---|---|---|---|
| 5,237,650 | A | * | 8/1993 | Priem et al. | 345/443 |
| 5,394,516 | A | * | 2/1995 | Winser | 345/419 |
| 5,684,939 | A | * | 11/1997 | Foran et al. | 345/431 |
| 5,886,701 | A | * | 3/1999 | Chauvin et al. | 345/418 |
| 5,949,428 | A | * | 9/1999 | Toelle et al. | 345/431 |
| 6,100,899 | A | * | 8/2000 | Ameline et al. | 345/605 |
| 6,232,979 | B1 | * | 5/2001 | Shochet | 345/419 |
| 6,377,265 | B1 | * | 4/2002 | Bong | 345/505 |

* cited by examiner

*Primary Examiner*—Michael Razavi
*Assistant Examiner*—Thu-Thao Havan
(74) *Attorney, Agent, or Firm*—Sawyer Law Group LLP

(57) ABSTRACT

A method and system for processing textures for a graphical image on a display is disclosed. The graphical image includes an object. The object includes a plurality of fragments. The method and system include providing a memory and providing a plurality of texture processors coupled with the memory. The memory is for storing a portion of a program for processing a plurality of textures for the plurality of fragments. Each of the plurality of texture processors is for processing a texture for a fragment in accordance with the program. The plurality of texture processors is capable of processing a part of the plurality of textures in parallel.

17 Claims, 9 Drawing Sheets

METHOD AND SYSTEM FOR PROVIDING PROGRAMMABLE TEXTURE PROCESSING

CROSS-REFERENCE TO RELATED APPLICATIONS

The present invention is related to co-pending U.S. patent application Ser. No. 08/624,261, entitled "METHOD AND APPARATUS FOR IDENTIFYING AN ELIMINATING THREE-DIMENSIONAL OBJECTS VISUALLY OBSTRUCTED FORM A PLANAR SURFACE" filed on Mar. 29, 1996 and assigned to the assignee of the present application. The present invention is also related to co-pending U.S. patent application Ser. No. 08/624,260, entitled "GRAPHICS PROCESSORS, SYSTEM AND METHOD FOR GENERATING SCREEN PIXELS IN RASTER ORDER UTILIZING A SINGLE INTERPOLATOR" filed on Mar. 29, 1996 and assigned to the assignee of the present application.

FIELD OF THE INVENTION

The present invention relates to displaying graphical image on a computer system and more particularly to a method and system for providing programmable texture processing for a graphical image.

BACKGROUND OF THE INVENTION

A conventional computer graphics system can display graphical images of objects on a display. The display includes a plurality of display elements, known as pixels, typically arranged in a grid. In order to display objects, the conventional computer graphics system typically breaks each object into a plurality of polygons. A conventional system then renders the polygons in a particular order. For a three-dimensional scene, the opaque polygons are generally rendered from front to back as measured from the viewing plane of the display. Translucent polygons are desired to be rendered from back to front. Similarly, a two-dimensional scene can be displayed. In such a case, polygons are rendered based on their layer. Shallower layers occlude deeper layers.

Each of the polygon covers, or intersects, some number of the pixels in the display. Data for a portion of a polygon which intersects a particular pixel is termed the fragment for that polygon and that pixel. Thus, each polygon typically includes a number of fragments. The fragment includes data relating to the polygon at the pixel the fragment intersects. For example, the fragment typically includes information relating to color, blending modes, and texture. In order to render each fragment of a polygon, a graphics processing system must process the color and texture for the fragment.

In order to process the fragment, conventional systems interpolate the color and accumulate the color and the texture for the fragment. The texture can be thought of as another color that is typically derived from a texture map. Thus, in most conventional systems, texture and color are blended together to obtain a final color value for the fragment. In order to process the texture, a texture map is typically used. The texture map contains data relating to a variety of textures. The conventional graphics system typically looks up a desired portion of the texture. This portion of a texture typically corresponds to a pixel and is called a texel. The texel includes color and α information, but is given a different name to indicate that it came from a texture, rather than an interpolated value, such as a color, or other source. The conventional graphics system then combines the texel with interpolated colors in a texture blending unit. Texture processing is typically followed by a blend which accounts for translucency of the fragment.

More recently, multiple texture mapping has been used. Multiple texture mapping blends multiple textures for a pixel to provide the desired appearance. For example, multiple texture mapping may combine interpolated color values, such as diffuse and specular interpolated values, with a first texture representing the look of the object, another texture representing light, and a third texture depicting a reflection of another portion of the scene to add gloss to the object. Thus, each pixel in the display can have the desired appearance.

One conventional method for providing multiple texture mapping uses multiple texture blending units. Each texture blending unit is typically an arithmetic logic unit. The first texture blending unit receives as inputs a texel and the interpolated values. The texture blending unit then blends the texel with one or more of the interpolated values. This blending is typically some algebraic operation which uses the texel and one or more of the interpolated values as operands. The resultant, as well as interpolated values, is passed to the next texture blending unit. This texture blending unit also receives as an input a texel from a texture map. This texture blending unit performs an operation on some of the inputs, including the texel, and provides an output to a subsequent texture blending unit. This process continues until a final resultant is provided. Another conventional method utilizes a software renderer. If implemented in hardware, the renderer would provide a single texture blending unit. The single texture blending unit would then perform multiple blends for each fragment. The resultant of each blend except the final blend would be provided back as an input of the texture blending unit.

Although the conventional methods for performing texture blends function, there are many different ways in which textures can be blended with interpolated values. The particular values blended, as well as the mathematical function used to blend the values can change. If all of these combinations are allowed in each texture blending unit, then each texture blending unit would be relatively large and complex. Therefore, only a limited subset of the functions is typically supported by the texture blending unit. In some cases, for example where the texture blending units are cascaded, the function provided by each of the texture blending units can be fixed. Although such a texture blending unit is smaller, its functionality is limited. Different applications may utilize different operations used in texture blending. If a particular application utilizes a texture blend not supported by the texture blending units, the graphical image generated by the application will not appear as desired. Thus, a system having texture blending units which are smaller may not be able to adapt to certain applications.

Accordingly, what is needed is a system and method for providing an adaptable mechanism for providing texture processing without impacting performance of the system. The present invention addresses such a need.

SUMMARY OF THE INVENTION

A method and system for processing textures for a graphical image on a display is disclosed. The graphical image includes an object. The object includes a plurality of fragments. The method and system comprise providing a memory and providing a plurality of texture processors coupled with the memory. The memory is for storing a portion of a program for processing a plurality of texture portions for the plurality of fragments. Each of the plurality of texture processors is for processing a texture portion for a fragment in accordance with the program. The plurality of texture processors is capable of processing a portion of the plurality of texture portions in parallel.

According to the system and method disclosed herein, the present invention provides texture processing which is adaptable and may occupy a reduced amount of space without adversely impacting processing.

DETAILED DESCRIPTION OF THE INVENTION

The present invention relates to an improvement in generation of graphical images. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
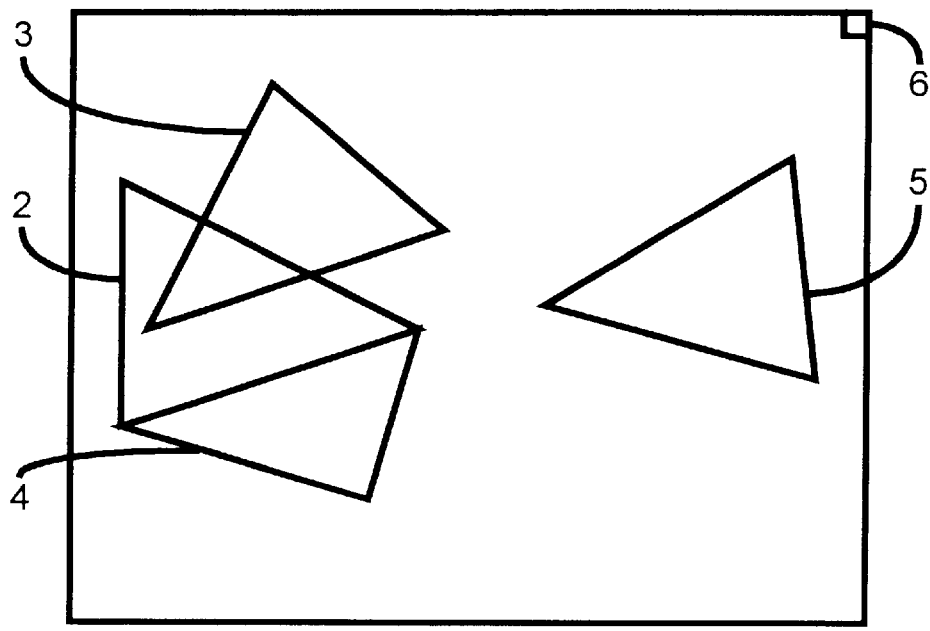
FIG. 1 is a block diagram of a display depicting a plurality of objects

FIG. 1 is a block diagram of a display 1 depicting a graphical image. The display includes a plurality of pixels 6, only one of which is labeled. The graphical image includes polygons 2, 3, 4, and 5, which may be part of an object. Each of the polygons 2, 3, 4, and 5 covers several pixels and includes a plurality of fragments. Each fragment includes data for a pixel intersected by the corresponding polygon. Thus, a fragment may include data relating to the color, texture, α values, and depth values for a particular polygon and a particular pixel.

Figure 2:
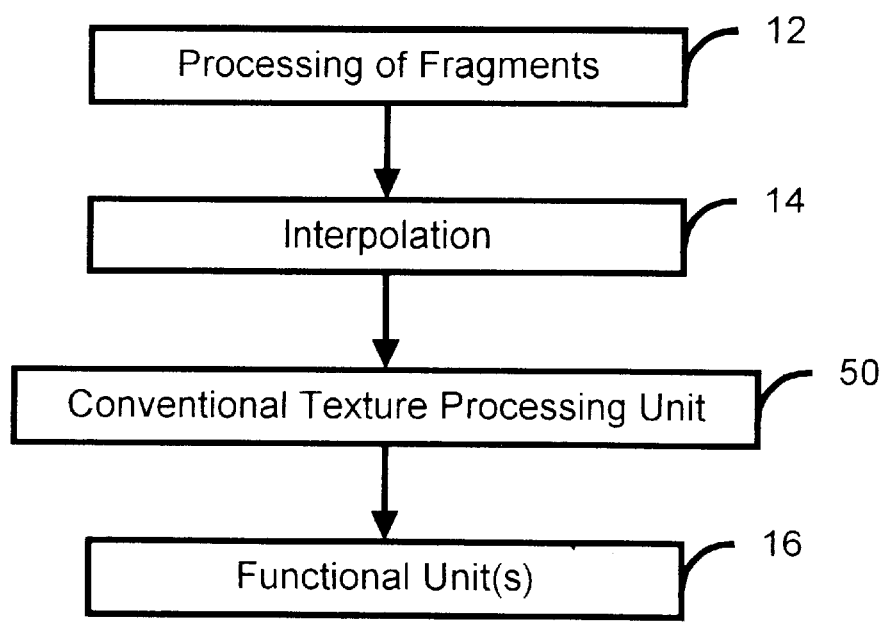
FIG. 2 is a block diagram of a portion of a conventional graphics system.

FIG. 2 depicts a block diagram of a portion of a conventional graphics system 10. The conventional graphics system 10 resides in a computer system (not shown) having a display 1. The conventional graphics system 10 is used by the computer system to generate graphical images for an application (not shown) running on the computer system. The conventional system 10 includes processing units 12, interpolators 14, a conventional texture unit 50, and conventional functional unit(s) 16. The processing units 12 provide data for each fragment in the polygons 2, 3, 4, and 5. The interpolators 14 interpolate values, such as color, for each fragment in the polygons 2, 3, 4, and 5. The conventional texture unit combines the interpolated values, such as colors, and textures to provide a color for each of the fragments. The conventional functional unit(s) 16 may provide a variety of functions used in rendering pixels. For example, the conventional functional unit(s) 16 may include an α blending unit to blend each fragment depending on its α value, or translucency. The functional unit(s) 16 may also provide depth comparison, stencil comparison, and other functions. When the desired functions have been provided, the conventional functional unit(s) 16 can also provide data to the display 1 or to a display memory, such as a frame buffer.

Figure 3:
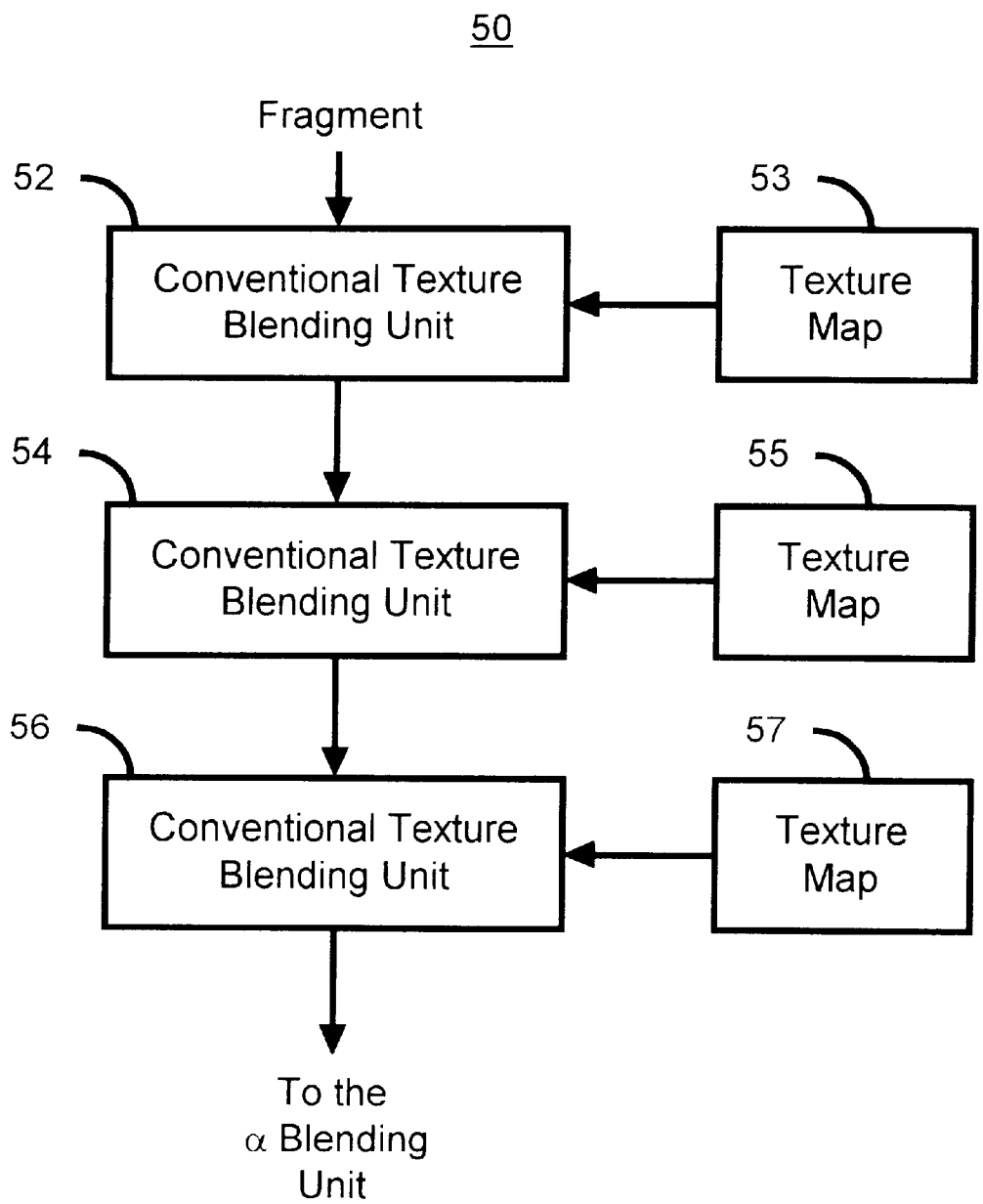
FIG. 3 is a block diagram of one conventional system for performing texture processing.

FIG. 3 depicts one conventional texture unit 50 which can blend multiple textures, providing multiple texture mapping. The conventional texture unit 50 includes conventional texture blending units 52, 54, and 56. Thus, the conventional texture unit 50 depicted in FIG. 3 is capable of blending three textures. Each of the conventional texture blending units 52, 54, and 56 is coupled with a texture map 53, 55, and 57, respectively. The texture maps 53, 55, and 57 includes multiple textures. The textures can cover many pixels. A single portion of a texture typically corresponds to a single pixel and is termed a texel. The texel generally includes color information and an α value. Thus, the texel is similar to the color information in a fragment. However, a texel is given a different name to distinguish the source of the information.

The interpolated values, such as diffuse and specular, are provided to the first conventional texture blending unit 52. A texel from the texture map is also provided to the texture blending unit 52. The conventional blending unit 52 then performs an operation on the texel, perhaps also using the interpolated values as operands. The resultant and other information, such as some or all of the interpolated values, are then passed to the next conventional texture blending unit 54. The next conventional texture blending unit 56 performs its operations using a texel from the texture map 55 and one or more of the inputs provided by the previous conventional texture blending unit 52. This process continues until the fragment has been processed by all of the conventional texture blending units 52, 54, and 56. Thus, each fragment cascades through a series of conventional texture blending units. When the fragment emerges from the last blending unit 56, the fragment has undergone multiple texture blends. The fragment may then be passed to the functional unit(s) 16.

Figure 4:
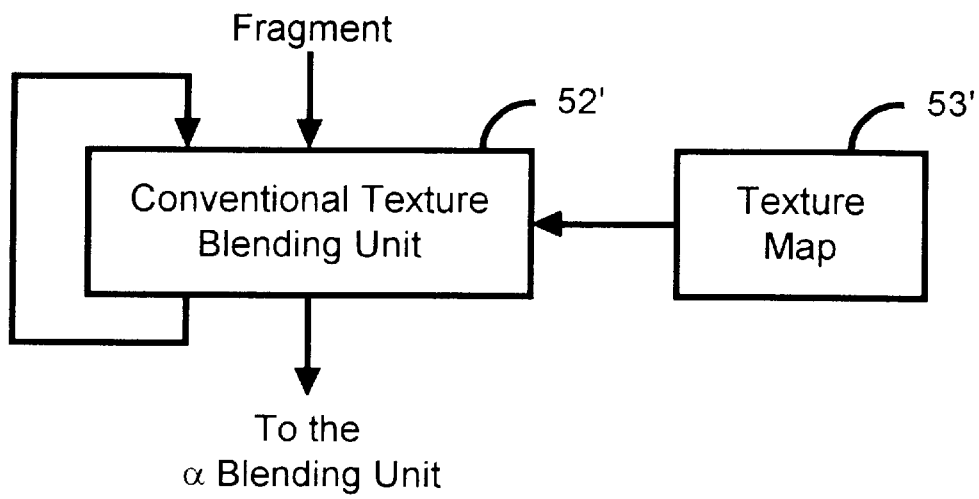
FIG. 4 is a block diagram of a hardware representation of a second conventional system for performing texture processing.

FIG. 4 depicts another conventional texture unit 50' which provides multiple texture blends. The conventional system 50' is a logical equivalent of a portion of a software renderer which provides texture blending in software. The conventional system 50' includes a conventional texture blending unit 52' and a texture map 53'. The conventional texture blending unit 52' receives as inputs values from the interpolator and a texel from the texture map 53'. One of the values input is the number of texels that will be blended for the fragment. The conventional texture blending unit 52' blends the texel. If the texel was not the last to be blended, the conventional texture blending unit 52' provides the result back to itself as an input.

Figure 5:
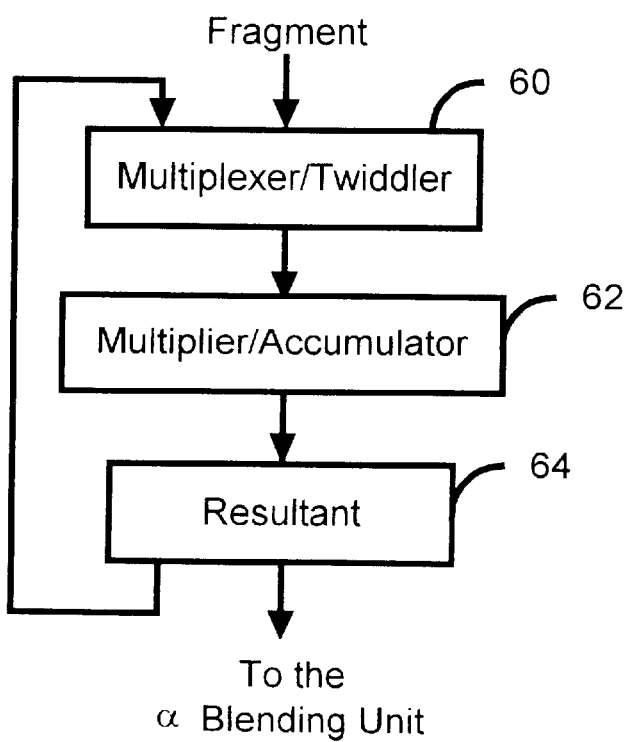
FIG. 5 is a block diagram of a conventional texture blending unit capable of performing multiple operations.

FIG. 5 depicts the conventional texture blending unit 52'. The conventional texture blending unit 52' includes a multiplexer/twiddler 60 coupled with a multiply/accumulator 62, and a resultant 64. The resultant 64 is coupled to the multiplexer/twiddler 60 through feedback 66. The multiplexer/twiddler 60 selects which of the inputs to provide to the multiply/accumulator 62. The multiplexer/twiddler 60 also typically performs some operations on the inputs to the multiply/accumulator 62. The multiply/accumulator 62 blends the operands provided by the multiplexer/twiddler 60 using some function. The result is provided to the resultant 64. If the result is to be used in another texture blend, then the resultant 64 provides the result to the multiplexer/twiddler 60 via feedback 66. Otherwise the result is output. If the conventional texture blending unit 52, 54, or 56 was depicted in FIG. 5, then the feedback 66 would not be provided. Instead, the result would be output for blending by the next texture blending unit 54 or 56, or to the functional unit(s) 16.

Although the conventional texture units 50 and 50' function, one of ordinary skill in the art will realize that the conventional texture blending units 52, 54, 56, and 52' are large, limited in function, or both. Different texture blends may be desired to be performed in the conventional texture blending units 52, 54, 56, and 52'. For example, different applications using the conventional graphics system 10 may desire different blends. Furthermore, in a given scene, different texture blends may be desired for different portions of the scene. For example, one conventional blending operation is (texel)×(diffuse)+specular. There are, however, many other ways in which texels and interpolated values can be combined. In order to allow for all of these combinations, the multiplexer/twiddler 60 would include a crossbar which allowed each input to be provided as the appropriate operand for the operation performed by the multiply/accumulator 62. There may also be several interpolated values provided to each conventional texture blending unit 52, 54, 56, or 52' in addition to at least one texel. Therefore, the crossbar may be both complex and large. Thus, the conventional texture unit 50 or 50' may occupy a large amount of space, which is undesirable.

In order to reduce the size of the conventional texture blending unit 52, 54, 56, or 52', the conventional texture blending units 52, 54, 56, or 58 may be allowed to perform only a small subset of the possible operations. Because fewer different operations are allowed, each interpolated value or texel is capable of being provided to fewer locations. Thus, the size and complexity of the crossbar in the multiplexer/twiddler 60 is reduced.

Although the size of the conventional texture blending units 52, 54, 56, or 58 and, therefore, the size of the conventional texture units 50 and 50' can be reduced, one of ordinary skill in the art will realize that the adaptability of the conventional texture units 50 and 50' is sacrificed. As discussed above, different texture blends may be desired. Reducing the size of the multiplexer/twiddler 60 reduces the ability of the conventional texture units 50 and 50' to provide different texture blends. Thus, the conventional texture units 50 and 50' may be unable to adapt to the blends used by different applications.

A method and system for processing textures for a graphical image on a display is disclosed. The graphical image includes an object. The object includes a plurality of fragments. The method and system comprise providing a memory and providing a plurality of texture processors coupled with the memory. The memory is for storing a portion of a program for processing a plurality of texture portions for the plurality of fragments. The each of the plurality of texture processors is for processing a texture for a fragment in accordance with the program. The plurality of texture processors is capable of processing a portion of the plurality of textures in parallel.

The present invention will be described in terms of texture blending using a texture lookup performed in a particular system. However, one of ordinary skill in the art will readily recognize that this method and system will operate effectively for other types processing for graphical images and other systems. For example, the present invention is described in the context of a system which renders a graphical image in raster order. However, the present invention is consistent with systems which process a graphical image in another order. The present invention is also described in the context of a system in which in which color blending and accumulating is provided by a separate unit from texture processing. Although these processes might be considered logically distinct, nothing prevents the present invention from being incorporated in a system in which the color blending and texture processing are accomplished in a single unit. Similarly, the present invention is consistent with another type of texture or color processing. Furthermore, the present invention is described in the context of particular texture processing units. However, the present invention can be used with other texture processing units. For example, the present invention is consistent with generating a texture from an algorithm that may be indicated by the program, rather than obtaining the texture from a texture map. The present invention is also described in the context of a particular number of texture processors, registers, objects, and other information. However, nothing prevents the present invention from use with a different number of components, such as a different number of processors. Furthermore, the present invention is described as blending texels. However, the present invention can be used to blend other quantities, including another portion of the texture, the texture itself.

Figure 6:
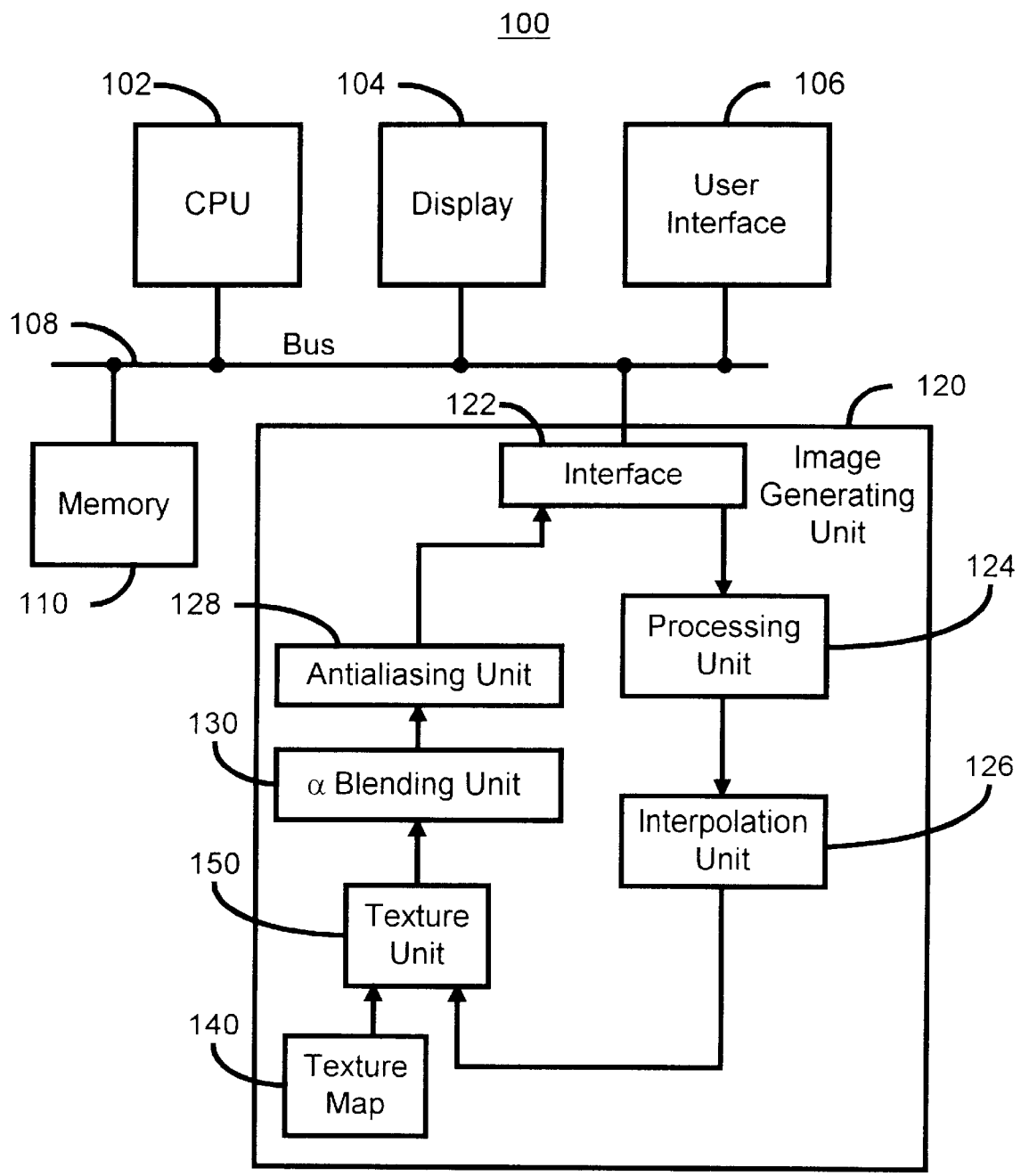
FIG. 6 is a high-level block diagram of computer system in which a system for providing a graphical image in accordance with the present invention can be implemented.

To more particularly illustrate the method and system in accordance with the present invention, refer now to FIG. 6, depicting a simplified block diagram of one embodiment of a computer graphics system 100 with which the present invention is used. Preferred embodiments of portions of the computer system 100 are described more completely in co-pending U.S. patent application Ser. No. 08/624,261 entitled "Method and Apparatus for Identifying and Eliminating Three-Dimensional Objects Visually Obstructed from a Planar Surface" filed on Mar. 29, 1996. Applicant hereby incorporates by reference the abovementioned co-pending application. The present invention is also related to co-pending U.S. patent application Ser. No. 08/624,260 entitled "Graphics Processors, System and Method for Generating Screen Pixels in Raster Order Utilizing a Single Interpolator" filed on Mar. 29, 1996. Applicant hereby incorporates by reference the above-mentioned co-pending application.

The computer graphics system 100 may be used to generate graphical images for an application, such as an application residing on the memory 110. In particular, the computer graphics system 100 is used to display objects, particularly three-dimensional objects. The computer graphics system 100 includes a central processing unit (CPU) 102, a display 104, a user interface 106 such as a keyboard or mouse or other communicating device, a memory 110, and an image generating unit 120 coupled with a bus 108. The display 104 includes a plurality of pixels, such as the pixels 50 in the display 10. Each of the plurality of pixels has an area. The display 104 could include a display memory (not explicitly shown) to which pixels are written, as well as a screen (not explicitly shown) on which the pixels are displayed to a user. Note, however, that nothing prevents the method and system from being implemented in a different computer system having other components. In a preferred embodiment, each object being displayed is preferably broken into polygons to be used in rendering the objects. In a preferred embodiment, the polygons are rendered in raster order, the order of the pixels in the display 104.

The image generating unit 120 includes an interface 122 connected to the bus 108, a processing unit 124, an interpolation unit 126, a texture map 140, a texture unit 150, an α blending unit 130, and an antialiasing unit 128. Although not depicted, the image generating unit 120 could have other functional unit(s) in addition to or in lieu of the cc blending unit 130 and the antialiasing unit 128. Furthermore, other units providing similar or additional functions could be used in addition to or in lieu of the processing unit 124 and the interpolation unit 126.

The interface 122 provides an interface between the remaining portions of the image generating unit 120 and the bus 108. The processing unit 124 identifies data describing portions of polygons ("intersecting polygons") which intersect the area extending along a z-axis from a selected pixel in an x-y plane corresponding to a screen of the display 104. In a preferred embodiment, the intersecting polygons are processed in parallel. The data for with the portion of the intersecting polygon associated with the selected pixel is termed a fragment. In the context of this disclosure, a fragment for an intersecting polygon will be described as intersecting the pixel that the polygon intersects. A fragment may include the color, texture, and depth value for the corresponding polygon. In a preferred embodiment, each fragment also includes a program ID, discussed below. The program ID for the fragment might be a program ID for a particular object of which the fragment is a part. Thus, each fragment that is part of the object would have the same program ID. In another embodiment, the program ID for a fragment might be the same for all fragments being processed for the application.

The interpolation unit 126 receives the fragments for the intersecting polygons for the selected pixel and interpolates the data, including interpolating texture, color, and alpha values for the fragment. In one embodiment, the interpolation unit also provides a mask for providing antialiasing of each fragment.

The fragments for the selected pixel are then provided to a texture unit 150 in accordance with the present invention. In a preferred embodiment, the fragments are sorted by a depth value, such as the z value, prior to being provided to the texture unit 150. The texture unit 150 is coupled to a texture map 140 and will be described more completely below. The texture map 140 provides textures to the texture unit 150. In a preferred embodiment, the texture map 140 provides texels to the texture unit 150. However, in an alternate embodiment, other portions of the texture can be used. Furthermore, texture used by the texture unit 150 can be generated by an algorithm or other means rather than by a look up in the texture map 140.

The texture unit 150 provides the texture processed fragments to an α blending unit 130, which performs α blending to account for translucency of the fragment. The α blending unit 130 provides the α blended fragments to an antialiasing unit 128. The antialiasing unit 128 performs antialiasing to reduce the jagged appearance of edges in the graphical image. However, in an alternate embodiment, other processing could be performed after the texture unit 150 performs its functions. The data for the selected pixel is then provided to the display 104. In one embodiment, the antialiased data is provided to a display memory in the display 104. Subsequent pixels are then identified as the selected pixel and processed, preferably in raster order. Thus, the objects in the graphical image can be rendered in raster order. Note, however, that the present invention can be used in a system which does not render images in raster order.

Figure 7:
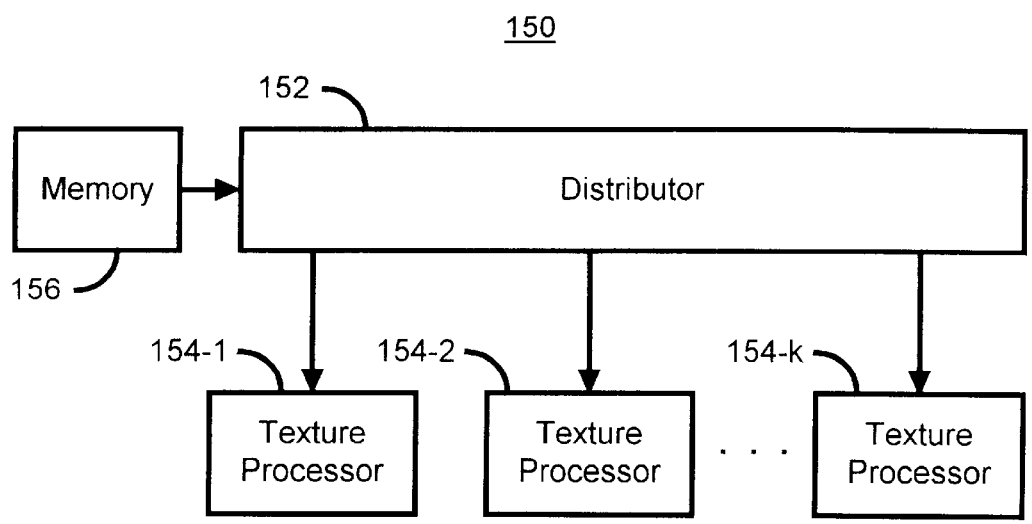
FIG. 7 is a high level block diagram of the data flow for texture unit in accordance with the present invention.

FIG. 7 depicts a high level block diagram of the data flow for the texture unit 150 in accordance with the present invention. The texture unit 150 includes a distributor 152, texture processors 154-1 through 154-$k$ coupled to the distributor, and a memory 156 coupled to the distributor 152. Fragments and texels input to the texture unit 150 are provided to the distributor 152. The distributor 152 distributes fragments to the texture processors 154-1 through 154-$k$ for texture processing. The texture processors 154-1 through 154-$k$ can, therefore, process k fragments in parallel. In a preferred embodiment, a texture processors 154-1 through 154-$k$ performs all of the texture processing for a particular fragment. However, in an alternate embodiment, a texture processor 154-1 through 154-$k$ may perform only a portion of the texture processing for a fragment. The remainder of the texture processing may be provided by another one of the texture processors 154-1 through 154-$k$.

The memory 156 holds at least a portion of one or more programs used by the texture processors 154-1 through 154-$k$. Thus, the memory 156 may be a cache of programs which are stored elsewhere, such as the memory 110. The program determines how the processors 154-1 through 154-$k$ provide texture processing. Preferably, the memory 156 resides near the texture processors 154-1 through 154-$k$ and uses to program ID to locate and import at least a portion of the program. In such a case, the program used by a texture processor 154-1 through 154-$k$ may be imported from the memory 110. In an alternate embodiment, the memory 156 can reside elsewhere, including in the memory 110. However, this may slow processing of the fragments.

Each of the texture processors 154-1 through 154-$k$ processes the textures in accordance with a program. Each texture processor 154-1 through 154-$k$ performs all of the texture blending for the fragment(s) which it receives. Thus, each texture processor 154-1 through 154-$k$ may perform multiple texture blends or other operations. The operations provided and the order in which the operations are provided are controlled by the program in the memory 156.

Figure 8:
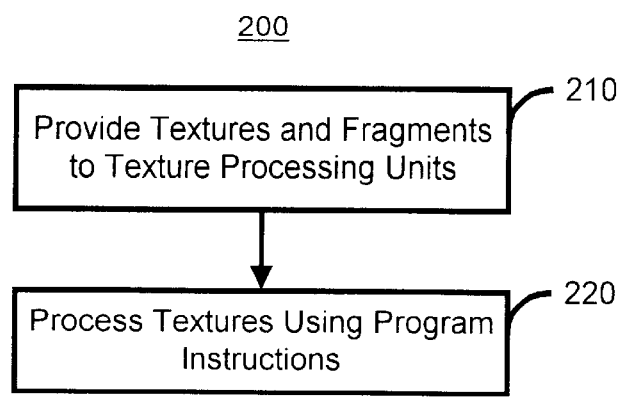
FIG. 8 is a high-level flow chart of a method in accordance with the present invention.

FIG. 8 depicts a high-level flow chart of one embodiment of a method 200 for providing texture processing in accordance with the present invention. The fragments, including the portions of the textures to be processed and any necessary program information, are provided to one or more of the texture processing units 152-1 through 152-$k$, via step 210. Preferably, the distributor 152 distributes the fragments in step 210. The portions of the textures are then processed in one or more of the texture processors 156-0 through 156-$k$ in accordance with the appropriate program, via step 220.

Because a program is used in processing the textures, the texture processors 154-1 through 154-$k$ can adapt to different blending operations on different inputs. Furthermore, the texture processors 154-1 through 154-$k$ can access registers (not shown in FIG. 7), instead of using a crossbar. Thus, the size of the texture unit 150 remains relatively small. Each texture processor 154-1 through 154-$k$ only provides an output when it has completed processing for the fragment. In contrast to the conventional texture blending units 52, 54, and 56 depicted in FIG. 3, the texture processors 154-1 through 154-$k$ in FIG. 7 do not provide an output each clock cycle. However, the time taken to process a fragment is not changed. Thus, a fragment finishes processing and is output from the texture unit 150 in the same number of cycles as for the conventional texture unit 50 or 50' performing the same number of texture blends. Multiple units work together in parallel to complete processing for one fragment per cycle. Thus, adaptability is provided without adversely impacting performance.

Figure 9:
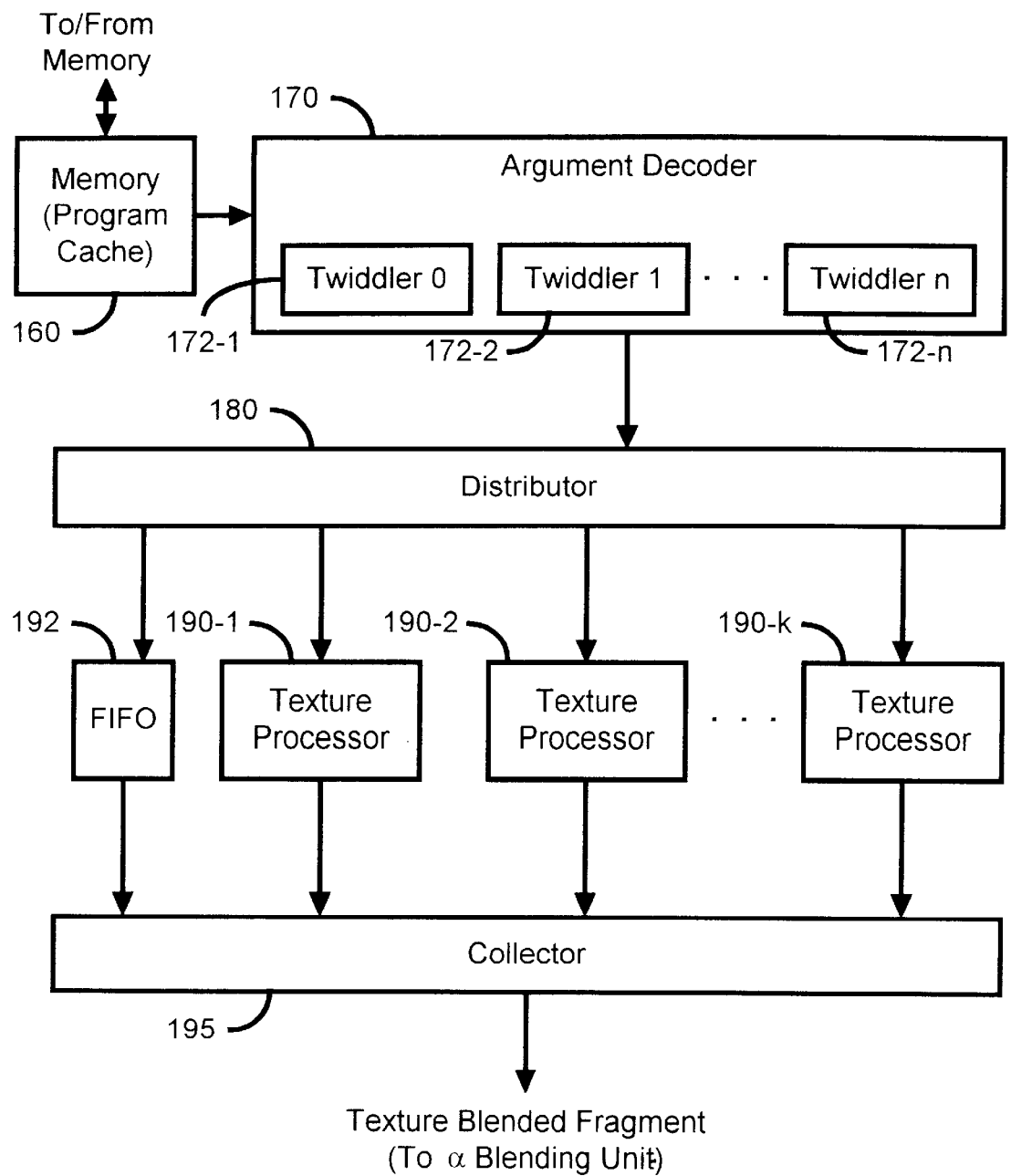
FIG. 9 is a more detailed block diagram of the data flow for a preferred embodiment of texture unit in accordance with the present invention.

FIG. 9 depicts a more detailed block diagram of the data flow for a preferred embodiment of the texture unit 150'. The texture unit 150' includes an argument decoder 170 coupled to a memory 160 that is preferably a program cache 160. The argument decoder 170 is also coupled to a distributor 180. The distributor is coupled to texture processors 190-1 through 190-$k$ and to a first in first out ("FIFO") buffer 192. The texture processors 190-1 through 190-$k$ and the FIFO buffer 192 are coupled to a collector 195.

In a preferred embodiment, the fragment includes color and α values. By the time the fragment reaches the texture unit 150', the fragment also includes portions of one or more textures, which have been retrieved from the texture map 140. The portion of each texture is preferably a texel. The fragment can also include a program ID. The program ID indicates the location of the program that will be used to provide texture processing for the fragment. In an alternate embodiment, the program used in processing the fragment can be obtained in another manner.

A portion of the fragment is input to the argument decoder 170, while the program ID is provided to the program cache 160. The argument decoder 170 receives as inputs interpolated values, such as color and α values for each fragment, and texels, which are preferably from a texture lookup in the texture map 140. In a preferred embodiment, the texels and colors are in RGB (red green blue) format. However, nothing prevents the use of another color format. Instructions from the program fetched into the program cache 160 are also provided to the argument decoder 170.

The argument decoder 170 preferably includes twiddlers 172-1 through 172-*n*. In a preferred embodiment, the number of twiddlers 172-1 through 172-*n* is the same as the number of registers (not shown) for each texture processor 190-1 through 190-*k*. The twiddlers 172-1 through 172-*n* perform preliminary operations on one or more of the inputs. The twiddlers 172-1 through 172-*n* are thus used to optimize performance of the texture unit 150' by performing certain simple operations before the blending operations performed by the texture processors 190-1 through 190-*k*. In addition, different functions may be provided by the twiddlers 172-1 through 172-*n* for different programs. For example, the blending provided in the texture processors 190-1 through 190-*k* may use the inverse of an input, such as an interpolated color. One of the twiddlers 172-1 through 172-*n* would be used to invert the interpolated color prior to processing by a texture processor 190-1 through 190-*k*. The twiddlers 172-1 through 172-*n* used and the operation performed depends upon the program instructions provided by the program cache 160. Thus, the number of twiddlers 172-1 through 172-*n* is need not be the same as the number of inputs to the argument decoder 170. Furthermore, in an alternate embodiment, the twiddlers 172-1 through 172-*n* are not used. Instead, the operations performed by the twiddles 172-1 through 172-*n* are performed within the texture processors 190-1 through 190-*k* under the direction of the program.

The argument decoder 170 provides the arguments for each fragment to the distributor 180. The arguments include the inputs which have been operated on by one or more of the twiddlers 172-1 through 172-*n* and any remaining inputs. Thus, the arguments may include the texels, colors, α values, resultants from the twiddlers 172-1 through 172-*n* and other information. The argument decoder 170 also passes program information to the distributor 180. The program information includes any remaining instructions to be performed by a texture processor 190-1 through 190-*k*. In one embodiment, the program information also includes information relating to the order in which the fragment should be provided to the collector 195. The distributor 180 passes the arguments and program information for a fragment to an appropriate texture processor 190-1 through 190-*k* for processing. The texture processor 190-1 through 190-*k* selected is preferably the least recently used texture processor 190-1 through 190-*k*. In a preferred embodiment, the distributor 180 also passes the identity of the selected texture processor 190-1 through 190-*k* to the FIFO 192.

The selected texture processor 190-1 through 190-*k* process the texel or texels for the fragment in accordance with the program information. The program ID is provided to the program cache 160 and, in a preferred embodiment, used to fetch the instructions used to control texture processing. In a preferred embodiment, the program cache 160 holds the entire program to be used in controlling texture processing. However, in an alternate embodiment, the program cache 160 can hold a portion of the program. In order to have access to the program, the program cache 160 is preferably coupled to a bus that is coupled with the memory 110. The program cache 160 holds the instructions to control the processing of the fragment. In a preferred embodiment, the size of the program cache 160 is fixed. The set of programs used to control the texture processing of a fragment typically does not change for graphical images generated for a particular application. Thus, the program ID may be provided for a particular application in lieu of providing a program ID for each fragment. However, the program may also change for different portions of a graphical image. Thus, the program ID may be based on the object of which the fragment is a part.

Using instructions stored in the program cache 160, a texture processor 190-1 through 190-*k* processes a fragment. Each of the texture processors 190-1 through 190-*k* can process a fragment, allowing k fragments to be processed in parallel. Thus, the texel(s) may be blended with the colors for the fragment. Once the textures have been processed, the fragment is provided to the collector 195.

The collector 195 ensures that the fragments are output from the texture unit 150' in the correct order. In a preferred embodiment, the collector 195 performs this function using the information from the FIFO 192. In a preferred embodiment, each fragment should take the same number of cycles to process and should be output in the order received by the texture unit 150'. Thus, fragments should be provided to the collector 195 in the order that the fragments were provided to the texture processors 190-1 through 190-*k*. The FIFO 192 outputs to the collector 195 the identities of the texture processors 190-1 through 190-*k* in the order in which the texture processors 190-1 through 190-*k* were selected for processing a fragment. The FIFO 192, therefore, provides the collector 195 with the identities of the texture processors 190-1 through 190-*k* in the correct order. When the collector 195 receives an identity of a texture processor 190-1 through 190-*k* from the FIFO 192, the collector 195 waits until the identified texture processor 190-1 through 190-*k* has completed processing its fragment. The collector 195 then receives the fragment from the identified texture processor 190-1 through 190-*k* and outputs the fragment from the texture unit 150'. Note that the collector 195 can also be configured to account for the texture processors 190-1 through 190-*k* completing processing in an unexpected order. Similarly, the collector 195 or the FIFO 192 can be modified to account for the situation where different texture processors 190-1 through 190-*k* are expected to take a different number of cycles to complete processing.

Figure 10:
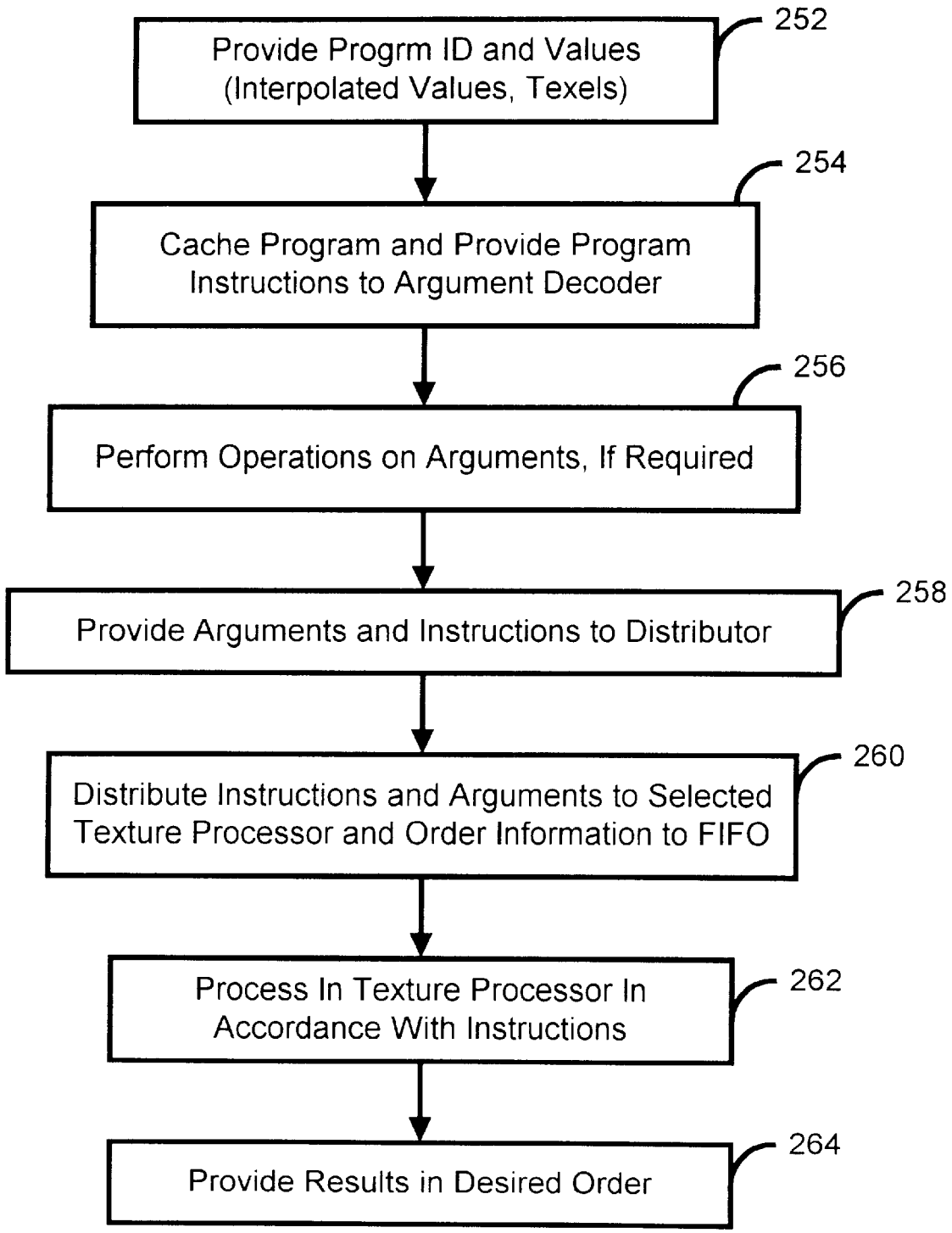
FIG. 10 is a flow chart of a method in accordance with the present invention.

FIG. 10 depicts a more detailed flow chart of a preferred embodiment of a method 250 for providing texture processing for a particular fragment using the texture unit 150'. The program ID and arguments, such as the interpolated values and portions of the textures, for a fragment are provided to the argument decoder 170, via step 252. If it has not already been cached, the instructions to be used in controlling texture processing are provided to the program cache 160, via step 254. Also in step 254, instructions are provided from the program cache 160 to the argument decoder 170. The method 250 describes the program instructions as passing through the same components of texture unit 150' as the fragment. However, nothing prevents the program instructions from passing through the texture unit 150' in another path as long as the texture processing can be controlled. These instructions allow the argument decoder to determine what operations to perform using twiddlers 172-1 through 172-*n* on which arguments input to the argument decoder 170. If instructed to do so, the argument decoder 170 the uses one or more the twiddlers 172-1 through 172-*n* on the appropriate argument or arguments, via step 256. Once the operations have been performed by the twiddlers 152-1 through 172-*n*, the argument decoder 170 passes the arguments for the fragment to the distributor 180, via step 258. Also in step 258 the remaining program instructions are passed to the distributor 180. The distributor 180 distributes the instructions and arguments to the appropriate texture processor 190-1 through 190-*k*, via step 260. Also in step 260, sufficient information for the fragment to be output in the desired order is provided to the FIFO 192. In a preferred embodiment, step 260 is performed using a "not currently in use" algorithm. This ensures that the fragment to be processed is passed to a texture processor 190-1 through 190-*k* that is not busy processing another fragment.

The texture processor 190-1 through 190-*k* selected in step 260 then processes the textures in the fragment in accordance with the instructions, via step 262. In a preferred embodiment, step 262 includes providing the resultant of the texture processing performed in step 260 and information relating to the fragment's order to the collector 195. This information relating to order is used because other fragments may be being processed in one or more of the remaining texture processors 190-1 through 190-*k*. When these remaining processors 190-1 through 190-*k* finish processing the other fragments, these other fragments are provided to the collector 195. Each texture processor 190-1 through 190-*k* may not take the same number of cycles to process a fragment. This is particularly true where the texture processors 190-1 through 190-*k* use different programs.

The fragment is then output from the texture unit 150' in the correct order, via step 264. In a preferred embodiment, the collector 195 outputs the fragments in the order that the fragments were input to the argument decoder 170. Also in a preferred embodiment, step 264 includes allowing the collector 195 to use the information provided to determine the desired order for the fragment and output the fragment in the desired order. Although texture processing for the fragments can be performed in parallel by the texture processors 190-1 through 190-*k*, the fragments may be output serially, in the order that the fragments were provided to the texture unit 150'.

Figure 11A:
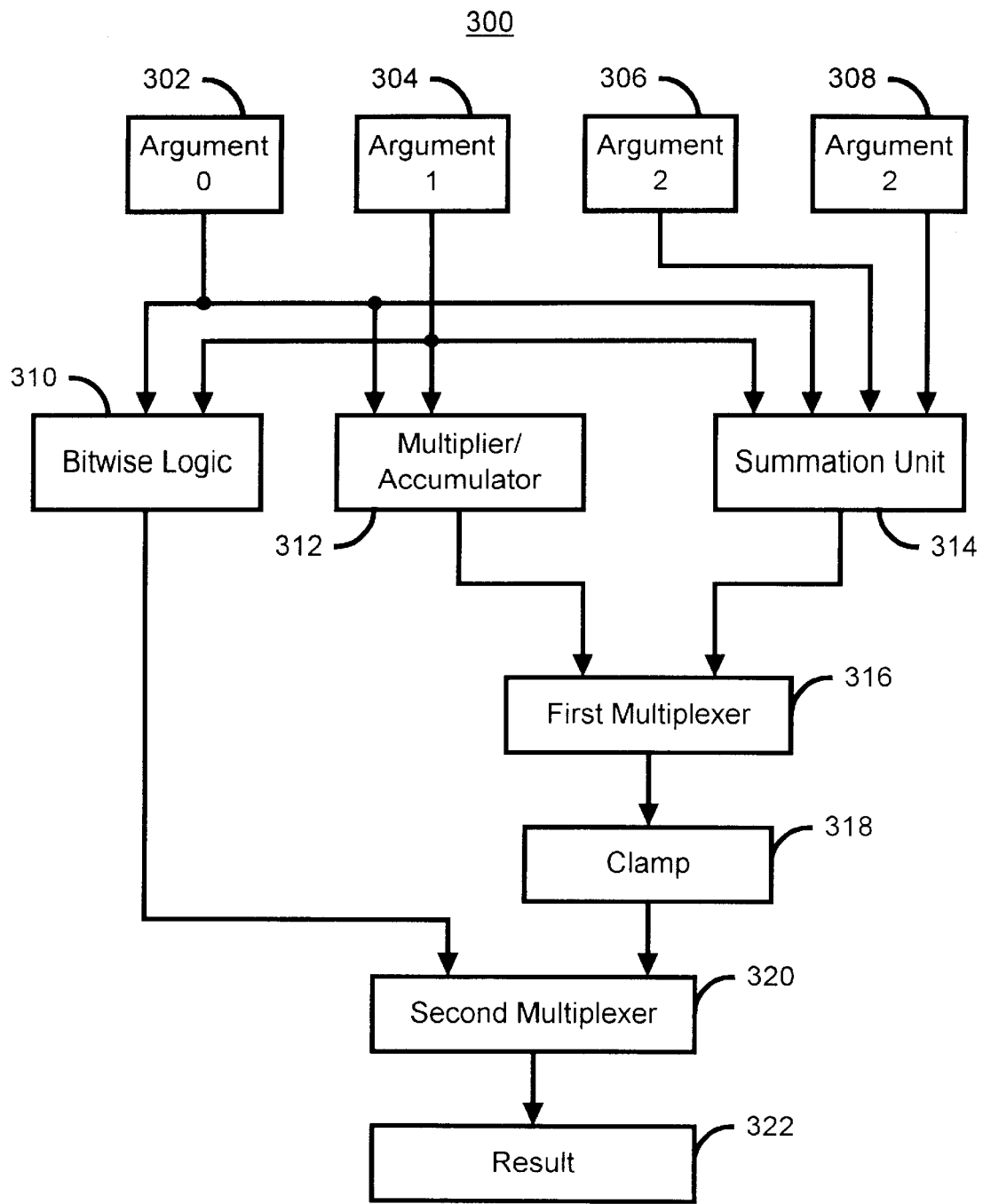
FIG. 11A is a block diagram of the data flow in a texture processor in accordance with the present invention.
Figure 11B:
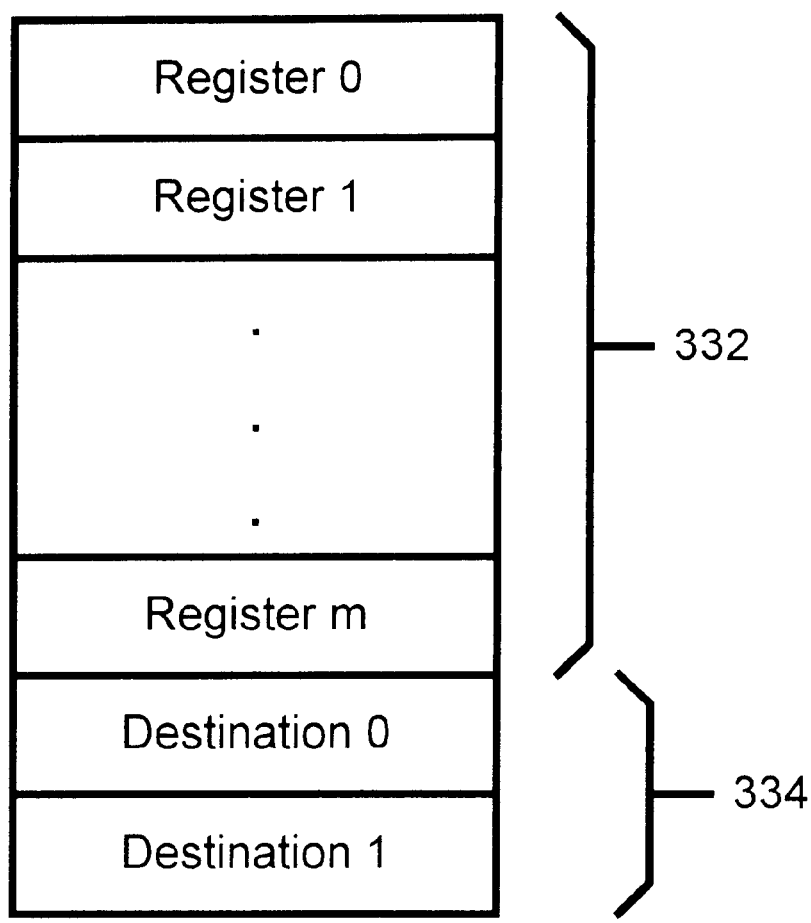
FIG. 11B is a block diagram of the registers used by the texture processor in accordance with the present invention.

FIGS. 11A and 11B depict block diagrams of the data flow for one embodiment of a texture processor 300 which may be used for the texture processors 190-1 through 190-*k* or 154-1 through 154-*k* and of the registers 330 used by the texture processor 300. In a preferred embodiment, the number of registers 330 is the same as the number of twiddlers 172-1 through 172-*n*. However, there may be another number of registers 330. In addition, the registers 330 may be used even if twiddlers 172-1 through 172-*n* are not present. The texture processor 300 utilizes operands 302, 304, 306, and 308. Thus, in the embodiment depicted in FIG. 11A, the texture processor can perform operations on four operands 302, 304, 306, and 308 during one clock cycle. The four operands 302, 304, 306, and 308 may be the arguments provided to the texture processor 300 from the distributor 180 or the result of a previous operation performed by the texture processor 300. The four operands 302, 304, 306, and 308 are obtained from one or more of the registers 330. The registers 330 include registers 332 which may hold interpolated values, texels, immediate values, or other information. The registers 330 also include destination registers 198. The destination registers 198 may be used to hold resultants of operations performed by the texture processor 300. The destination registers 198 may also be used to provide one or more of the operands 302, 304, 306, and 308. Thus, the resultant of an operation performed by the texture processor 300 can be input as an operand to the texture processor 300, allowing the texture processor 300 to perform multiple texture blends for a fragment.

The texture processor 300 also includes bitwise logic 310, multiplier/accumulator 312, and summation unit 314. The argument 302 and 304 can be provided to the bitwise logic 310, multiplier/accumulator 312, and summation unit 314. Arguments 306 and 308 can be provided to summation unit 314. Thus, in the texture processor 300 depicted in FIG. 11A cannot utilize both bitwise logic 310 and multiplier/accumulator 312 in the same cycle. However, in another embodiment, the texture processor 300 could be capable of using bitwise logic 310 and a multiplier/accumulator 312 in the same cycle.

The texture processor 300 also includes a first multiplexer 316 to select between an output from the multiplier/accumulator 312 and an output from the summation unit 314, which can both be used in the same cycle. However, as shown in FIG. 11A only one of the multiplier/accumulator 312 or the summation unit 314 is used. The texture processor 300 also includes a clamp 318 for optionally clamping the output selected by the first multiplexer 316. The texture processor 300 also includes a second multiplexer 320 for selecting between the output of bitwise logic 310 and the output selected by the first multiplexer 316. Thus, the multiplexer 320 selects the resultant 322. The resultant 322 can be provided to one of the destination registers 334. Thus, the texture processor 300 can perform any one of the operations provided by the bitwise logic 310, the multiplier/accumulator 312, or the summation 314 in a cycle.

The texture processor 300 can thus perform multiple operations. Furthermore, the texture processor 300 performs the operations based on the program instructions provided. The texture processor 300 and, therefore, the texture unit 150 or 150' can be adapted to perform a variety of texture blends. This adaptability is provided without employing a large, complex crossbar. Instead, the registers 330 are used. Thus, the texture processor 300 and, therefore, 150 or 150' are not greatly increased in size. Because multiple texture units 154-1 through 154-*k* and 190-1 and 190-*k* are used, the texture units 150 or 150' can also process multiple fragments in parallel. Thus, each texture processor 154-1 through 154-*k*, 190-1 through 190-*k*, or 300 performs multiple operations and outputs a fragment after j cycles, where a fragment takes j cycles to process. However, because the texture processors 154-1 through 154-*k* or 190-1 through 190-*k* can processes up to k fragments in parallel, the texture unit 150 or 150' may still be capable of outputting processed fragments each clock cycle. The performance of the texture unit 150 or 150' and the computer graphics system 100 may not suffer while adaptability of the texture unit 150 or 150' is improved and the size of the texture unit 150 or 150' is reduced.

A method and system has been disclosed for providing texture processing using a plurality of texture processors controlled by a program. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for processing textures for a graphical image on a display, the graphical image including an object, the object including a plurality of fragments, the system comprising:

a memory for storing a portion of a program for processing a plurality of texture portions for the plurality of fragments, the portion of the program including a plurality of instructions; and a plurality of texture processor coupled with the memory, each of the plurality of texture processor for processing a portion of the plurality of texture portions for a fragment of the plurality of fragments in accordance with the program, the plurality of texture processors capable of processing a second portion of the plurality of texture portions in parallel;

wherein the program can be modified or replaced; and wherein the program thereby controls processing of the portion of the plurality of texture portions by the plurality of texture processors; and wherein each of the plurality of texture processors implements a portion of the plurality of instructions such that the plurality of texture portions for the plurality of fragments can be processed using different texture blends.

2. The system of claim 1 further comprising:

a distributor coupled to the plurality of texture processors for distributing the plurality of texture portions to the plurality of texture processors.

3. The system of claim 2 further comprising:

an argument decoder for providing the plurality of texture portions to the distributor and for performing at least one operation on a third portion of the plurality of texture portions.

4. The system of claim 2 further comprising:

an argument decoder for providing the plurality of texture portions to the distributor and for performing at least one operation on a third portion of the plurality of texture processors.

5. The system of claim 1 wherein each of the plurality of texture processors further includes:

bitwise logic;

a multiplier-adder coupled with the bitwise logic;

a summer coupled with the multiplier-adder; and a selection means coupled with the bitwise logic, the multiplier-adder, and the summer, for selecting a resultant from the bitwise logic, the multiplier-adder and the summer.

6. The system of claim 1 wherein each of the plurality of texture processors further includes:

bitwise logic, a multiplier-adder coupled with the bitwise logic; and a summer coupled with the multiplier-adder; and a selection means coupled with the bitwise logic, the multiplier-adder, and the summer, for selecting a resultant from the bitwise logic, the multiplier-added, and the summer.

7. The system of claim 6 wherein the display the plurality of fragments intersect a portion of the plurality of fragments intersect a portion of the plurality of pixels, wherein the plurality of texture portions are a plurality texels and wherein each of the plurality of texture processors receive at least one texel of the plurality of texels and at least one interpolated value as inputs.

8. A method for processing textures of a graphical image on a display, the graphical image including an object, the object including a plurality of fragments, the method comprising the steps of:

(a) providing a plurality of texture portions for the plurality of fragments to a plurality of texture processors, the plurality of texture processors for processing a portion of the plurality of texture portions in parallel; and (b) processing the plurality of texture portions in the plurality of texture processors based on at least one program;

wherein the at least one program can be modified or replaced; and wherein the at least one program thereby controls processing of the plurality of texture portions by the plurality of texture processors; and wherein the at least one program includes a plurality of instructions and the plurality of texture processors implements a portion of the plurality of instructions such that the plurality of texture portions for the plurality of fragments can be processed using different texture blends.

9. The method of claim 8 wherein the providing step (a) further includes the step of:

(a1) providing the plurality of texture portions from a distributor coupled to the plurality of texture processors.

10. The method of claim 9 further comprising the step of:

(c) performing at least one operation on a texture portion of the plurality of texture portions prior to providing the texture portion to a texture processor of the plurality of texture processors.

11. The method of claim 8 further wherein the fragment includes a program identification, and wherein the method further includes the step of:

(c) fetching a portion of the program using the program identification.

12. The method of claim 8 wherein the processing step (b) further includes the steps of:

(b1) blending the plurality of texture portions in the plurality of texture processors based on the at least one program.

13. The method of claim 12 wherein the plurality of texture portions are a plurality of texels, wherein each of the plurality of texture processors receive at least one texel and at least one interpolated value as inputs.

14. The system of claim 1 wherein the program controls at least one texture blending operation in each of the plurality of texture processors.

15. The system of claim 1 wherein the program controls at least one input to for the plurality of texture processors.

16. The method of claim 8 wherein the program controls at least one texture blending operation in each of the plurality of texture processors.

17. The method of claim 8 wherein the program controls at least one input to for the plurality of texture processors.

* * * * *